Aug. 22, 1933.   E. A. RAINES   1,923,503
TANK VALVE
Filed Nov. 5, 1930
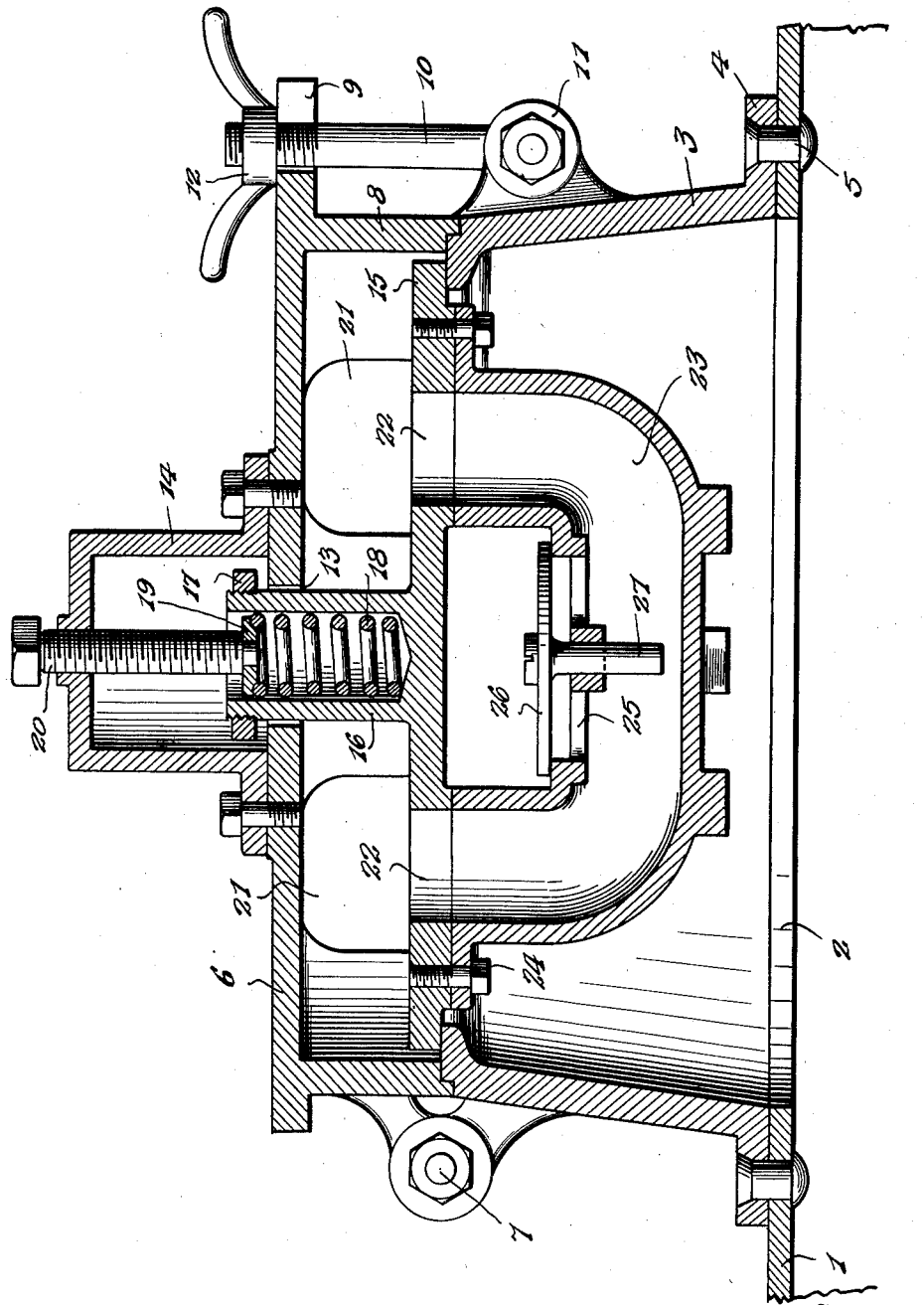
Inventor
E. A. Raines.
By Lacey & Lacey,
Attorneys Patented Aug. 22, 1933

1,923,503

UNITED STATES PATENT OFFICE 1,923,503

TANK VALVE

Ewell A. Raines, Tulsa, Okla.

Application November 5, 1930. Serial No. 493,615

7 Claims. (Cl. 220—44)

The object of this invention is to provide a simple and efficient device whereby the necessary pressure will be maintained upon the oil within a storage tank and excessive pressure which may accumulate in the tank will be permitted to escape. In the use of tanks to maintain crude oil in storage, it is very necessary to maintain a predetermined pressure upon the oil in order to maintain the specific gravity of the same and prevent loss of the gasoline content by evaporation. The tanks are gauged often and an oil thief is utilized before the oil is pumped into the pipe lines for transportation to the refinery in order that the specific gravity of the oil may be tested and it is, therefore, necessary to have easy access to the oil. When the tanks are being pumped, means must be provided for intake of air to replace the oil drawn from the tank and this means is generally in the form of what is known as a vacuum valve. The vacuum valve must be sensitive to open under a very slight vacuum or the tank is liable to collapse. It is, therefore, the object of the present invention to provide a very sensitive valve which will maintain the desired pressure on the oil and will readily permit excess pressure to escape while at the same time providing for adjustment of the valve to meet temperature and other weather conditions. It is also a particular object of the invention to provide a structure which will obviate the necessity for rubber gaskets or packing which quickly deteriorate from the action of the sulphur fumes arising from the oil. The invention, of course, also seeks to provide a valve having the stated characteristics which will also permit the ready insertion of the oil thief or sample bucket, and the several stated objects, and other objects which will incidentally appear in the course of the following description, are attained in such a device as is illustrated in the accompanying drawing. The invention resides in certain novel features which will be particularly pointed out in the appended claims.

The drawing is a vertical diametrical section of a valve embodying the present invention.

In the drawing, the reference numeral 1 indicates a portion of an oil tank having an opening 2 through its top and over which the valve of the invention is mounted. In carrying out the invention, there is provided an annular body 3 having its upper end rabbeted and provided at its lower edge with a flange or lugs 4 through which rivets or similar fasteners 5 are inserted to rigidly secure the body upon the tank. A cover 6 is hinged to the body, as indicated at 7, and comprises a rim 8 disposed in vertical alinement with the body and having a depending rib adapted to rest directly upon the upper rabbeted edge of the body, as clearly shown. It will be noted that the upper edge of the body is flat or smooth and the lower edge of the rim 8 abuts squarely upon the edge of the body. The parts are of metal and will be nicely finished so that when they are in contact a ground joint will be provided which will prevent leakage and will obviate the necessity of employing gaskets or packing which will quickly wear out. Diametrically opposite the hinge 7, the cover 6 is provided with a forked projection 9 through which may pass the upper end of a latch bolt 10 which is pivoted at its lower end upon a lug 11 provided on the side of the valve body 3, as clearly shown. Upon the upper extremity of this latch bolt 10 is mounted a wing nut 12 which is adapted to be turned home against the projection 9 and thereby lock the cover firmly upon the body. When it is necessary to take a sample of the oil, the wing nut is loosened, whereupon the bolt may be swung out of engagement with the forked projection of the cover and the cover then swung up and over about the hinge 7, as will be understood.

The cover 6 is provided with a central opening 13 and on the outer side of the cover is secured a bonnet 14 which is disposed concentric with said opening and houses the same. A valve disk 15 is disposed within the cover and has its margin resting upon the inner portion of the upper edge of the body 3 and forming a ground joint therewith so that the open top of the body will be normally closed by said valve disk. Rising centrally from this valve disk is a socket or chamber 16 which passes through the opening 13 in the cover and has a nut 17 threaded onto its upper end and adapted to rest on the upper surface of the cover within the bonnet 14 to support the disk when the cover is swung to open position. Housed within the socket or chamber 16 is an expansion coiled spring 18 having its lower end resting on the bottom or floor of the socket and its upper end bearing against a pressure disk 19 which is carried by the lower end of an adjusting screw 20 which is threaded through the top of the bonnet 14. By turning the screw 20 in the proper direction the tension of the spring 18 may be increased or decreased and, accordingly, the valve disk held to its seat upon the valve body 3 with more or less pressure so that it will resist a greater or less degree of pressure within the tank. The rim 8 of the cover is formed with openings 21 therethrough through which air may pass to and from the body and it will now be understood that when the pressure within the tank exceeds the tension of the spring 18 the valve disk will be lifted more or less from its seat and the gases generated within the tank will escape around the edge of the disk and out through the ports or openings 21. It will be understood that in hot weather there is a greater tendency of the oil to evaporate and consequently a greater pressure will be set up inside the tanks, and the provision of the adjusting screw 20 and spring 18 permits the operator to regulate the valve so as to accommodate the varying conditions.

Ports 22 are formed through the valve disk 15 and on the under side of the valve is suspended a bowl or manifold tube 23 which has its ends alined axially with said ports so as to establish direct communication with the same and through the same with the interior of the cover. The manifold 23 is secured to the valve 15 by bolts 24 inserted through lugs or a flange on the manifold and threaded into the valve, as will be understood. It will be noted that the portion of the manifold between its ends is spaced from the valve and is below the same, the manifold being in the form of a tube or pipe having both its ends upturned. In the upper wall of the manifold between its ends are ports 25 provided by a spider which constitutes the top of the manifold in an obvious manner, and seating upon the manifold is a gravity valve 26 consisting of a disk resting at its margin upon the manifold and having a central stem 27 depending through the center of the spider to be guided by the same. When oil is being drawn from the tank, it is, of course, necessary to admit air to the tank to take the place of the oil which is withdrawn and thereby prevent the formation of a vacuum. The suction applied to the oil to draw off the same will, of course, act through the entire interior of the tank and will create a draft past the valve 26 from the ports 21 through the manifold and into the tank, as a result of which the disk valve 26 will be raised from its seat and air will then flow past the same and spread around the manifold within the tank. When the tank is being filled, the pressure therein will lift the valve 15 with the manifold attached thereto against the tension of the spring 18 so that the excess air may escape around the edge of the valve 15 and then out through the ports 21.

From the foregoing description, taken in connection with the accompanying drawing, it will be seen that I have provided an exceedingly simple and compact device whereby excess pressure within a tank will be accommodated and relieved and means are provided to admit air to the tank in sufficient quantities to replace oil drawn therefrom. It is to be particularly noted that the provision of an inner ground joint at the margin of the valve disk 15 obviates the necessity of an air-tight joint between the valve body and the rim 8.

Having thus described the invention, I claim:

1. A tank valve comprising a valve body, to be secured on a tank, a cover hinged to the body and having a depending rim disposed in vertical alinement with and adapted to seat upon the upper edges of the body, and a valve mounted within and carried by the cover and seating directly upon the upper edge of the valve body, the rim of the cover having ports therethrough above the valve, and yieldable means on the cover for holding the valve to the valve body, the valve being completely housed by the body and the cover.

2. In a tank valve, a valve body to be secured on a tank, a cover hinged to the valve body and having a rim resting on the upper edge of the body, a valve disk carried by the cover and seating on the upper edge of the valve body, variable pressure means mounted in the cover and holding the valve normally to its seat on the valve body, the rim of the cover having ports therethrough above the valve and the valve being also provided with ports therethrough, a manifold mounted on the under side of the valve having its ends registering with the ports therethrough and provided with outlet ports between its ends, and a gravity valve normally closing said ports in the manifold, the valves and the manifold being completely housed by the body and the cover.

3. A tank valve comprising an annular valve body to be secured at its lower end to a tank, a cover having an annular rim normally resting on the upper edge of the valve body and forming a ground joint therewith, said cover rim having ports therethrough, a pressure valve suspended within and carried by the cover and normally seating on the upper edge of the valve body and provided with ports therethrough, a manifold secured on the under side of the pressure valve and having its ends registering with the ports through said valve and its intermediate portion spaced from the valve and provided with ports, and a gravity valve normally closing said ports in the manifold.

4. In a tank valve, an annular valve body, a cover hinged to the body and having an annular rim seating upon the body and provided with ports therethrough, the cover having a central opening, a bonnet secured on the cover around said central opening, a valve disk arranged within the cover, means rising from said disk through the central opening of the cover for suspending the disk from the cover, means housed within the bonnet for exerting variable pressure upon the valve. The valve disk having ports therethrough, a manifold secured on the under side of the valve disk and having its ends registering with the ports therein and its intermediate portion provided with inlet ports, and a gravity valve seating upon the intermediate portion of the manifold and normally closing said ports.

5. The combination of a body, a cover secured thereon in vertical alinement therewith and provided with air ports, a valve hung in the cover to seat on the body and cut off the air ports in the cover, and yieldable means carried by the cover for holding said valve normally seated.

6. The combination of a body having its upper edge rabbeted, a cover secured thereon and having a rim provided with a depending rib fitted within the rabbeted edge of the cover, said rim being provided with air ports, a pressure relief valve carried within and by the cover and normally seating on the body to cut off flow through the ports in the cover, said valve having ports therethrough, and a vacuum valve carried by the pressure relief valve and normally cutting off flow through the ports therein.

7. The combination of a body, a cover secured thereon and provided with air ports, a pressure relief valve carried by and within the cover and normally seating on the body to cut off flow through the ports in the cover, said valve having ports therethrough, a manifold mounted on the pressure relief valve and communicating through the ports therein with the ports in the cover, and a vacuum valve mounted on the manifold and normally cutting off flow therethrough.

EWELL A. RAINES. [L. S.]